(12) United States Patent
Knapp et al.

(10) Patent No.: US 7,049,787 B2
(45) Date of Patent: May 23, 2006

(54) CONVERTER CIRCUIT WITH SHORT-CIRCUIT CURRENT PROTECTION

(75) Inventors: Gerold Knapp, Ennetbaden (CH); Pascal Mauron, Uberstorf (CH); Christoph Stemmler, Baden (CH)

(73) Assignee: ABB Schweiz AG, Baden (CH)

( * ) Notice: Subject to any disclaimer, the term of this patent is extended or adjusted under 35 U.S.C. 154(b) by 40 days.

(21) Appl. No.: 10/781,647

(22) Filed: Feb. 20, 2004

(65) Prior Publication Data
US 2004/0170034 A1 Sep. 2, 2004

(30) Foreign Application Priority Data
Feb. 28, 2003 (EP) .................... 03405138

(51) Int. Cl.
*H02P 5/34* (2006.01)
*H02M 1/12* (2006.01)

(52) U.S. Cl. .................... 318/801; 318/729; 363/41; 363/161

(58) Field of Classification Search ............ 363/37–41, 363/97, 89, 16, 17, 19, 20, 160, 161; 318/254, 318/380, 810, 270, 807–811, 801, 729; 361/91.1
See application file for complete search history.

(56) References Cited

U.S. PATENT DOCUMENTS

| | | | | |
|---|---|---|---|---|
| 4,779,034 A | * | 10/1988 | Shepard, Jr. ................ | 318/804 |
| 5,091,840 A | * | 2/1992 | Walker ...................... | 363/96 |
| 5,365,424 A | * | 11/1994 | Deam et al. ................ | 363/144 |
| 5,450,306 A | * | 9/1995 | Garces et al. ................ | 363/41 |

FOREIGN PATENT DOCUMENTS

| | | |
|---|---|---|
| JP | 6-311730 | 11/1994 |
| JP | 057782 | 2/2001 |
| JP | 057782 | * 2/2005 |

OTHER PUBLICATIONS

Karsten Ries, Henrik Rasmussen, Peter Bjornaa, "Determination of Added Inductance By Fuses In DC-Link Inverter Applications", Drives and Controls, Mar. 13, 2001, Seiten 1-9, London.

* cited by examiner

*Primary Examiner*—Rajnikant B. Patel
(74) *Attorney, Agent, or Firm*—Buchanan Ingersoll PC

(57) ABSTRACT

A converter circuit with short-circuit current protection having a DC voltage circuit (1) is proposed, which DC voltage circuit (1) is formed by a DC voltage circuit subsystem (2.1), the DC voltage circuit subsystem (2.1) having a first energy store (3) and a second energy store (4), which is connected in series with the first energy store (3), and a fuse (5). Furthermore, the converter circuit has at least one pair of branches (6) provided for each phase (R, S, T) and connected in parallel with the DC voltage circuit (1), each pair of branches (6) having power semiconductor switches. In order to achieve a low-inductance converter circuit, the fuse (5) forms the connection between the first energy store (3) and the second energy store (4).

8 Claims, 5 Drawing Sheets

CONVERTER CIRCUIT WITH SHORT-CIRCUIT CURRENT PROTECTION

TECHNICAL BACKGROUND

The invention relates to the field of power electronics. It is based on a converter circuit with short-circuit current protection according to the preamble of the independent claim.

PRIOR ART

Converter circuits are used today in a wealth of power electronics applications, for example in drive technology for railroad applications or in solid-state conversion devices. Such a converter circuit is usually protected against the occurrence of a short-circuit current to prevent the converter circuit from being damaged or destroyed. Such a converter circuit with short-circuit current protection is mentioned, for example, in "Determination of added inductance by fuses in DC-link inverter applications, Drive & Control Mar. 13–15, Mar. 2001 London". In this case the converter circuit has a DC voltage circuit which is formed by a DC voltage circuit subsystem, the DC voltage circuit subsystem having a first energy store. The DC voltage circuit subsystem also has a second energy store, which is connected in series with the first energy store, and fuses. The two energy stores are each in the form of a capacitor, each of the capacitors being connected to the busbar system of the DC voltage circuit via a fuse connected in series. The converter circuit also has at least one pair of branches provided for each phase and connected in parallel with the DC voltage circuit via the busbar system, each pair of branches having power semiconductor switches. If, now, a short-circuit current occurs in one or more of the drivable power semiconductor switches of a pair of branches, the two capacitors are discharged very rapidly, the short-circuit current mainly flowing via the short-circuited power semiconductor switch(es) of the corresponding pair of branches. The in each case one fuse on the corresponding capacitor serves the purpose, as rapidly as possible, of keeping this short-circuit current away from the pair of branches which is predominantly affected by the short-circuit current and from the other pairs of branches by isolating the DC voltage circuit subsystem and thus the DC voltage circuit itself.

One problem with a converter circuit with short-circuit current protection according to "Determination of added inductance by fuses in DC-link inverter applications, Drive & Control Mar. 13–15, 2001, London" is the fact that the two fuses connected in series with the capacitors and the connection of the two capacitors result in the DC voltage circuit, and thus the converter circuit with short-circuit current protection, being highly inductive, since the parasitic inductances of the two fuses and of the connection of the two capacitors are totaled. This total parasitic inductance forms, with the two capacitors, an oscillation path which is only slightly damped and is caused to oscillate again with every switching procedure undertaken by the corresponding power semiconductor switch, in particular when it is switched off. The electrical energy stored in the total parasitic inductance results, in the event of such oscillations, in a current amplitude of these oscillations which is of the same order of magnitude as the switched-off current. The damping of these oscillations and thus the dissipation of the electrical energy stored in the total parasitic inductance take place exclusively by the current flowing in the non-reactive resistance components of the two capacitors of the DC voltage circuit and the busbar system. This leads to higher electrical and thermal loads on these components with respect to power loss. Furthermore, the design of the DC voltage circuit subsystem, owing to the two fuses, is complex in terms of assembly and requires a large number of components which results in considerable costs. In addition, the two fuses to be provided for the DC voltage circuit subsystem occupy a large amount of space. A more compact design for a converter circuit with short-circuit current protection, as is required, for example, for traction applications in electric railroads, is thus not possible or only possible to a very limited extent.

DESCRIPTION OF THE INVENTION

The object of the invention is therefore to propose a converter circuit with short-circuit current protection which has low inductance, which can be produced in a simple manner and using few components and which has a low space requirement. This object is achieved by the features of claim 1. Advantageous developments of the invention are described in the dependent claims.

The converter circuit with short-circuit current protection according to the invention has a DC voltage circuit which is formed by a DC voltage circuit subsystem, the DC voltage circuit subsystem having a first energy store and a second energy store, which is connected in series with the first energy store, and a fuse. Furthermore, the converter circuit has at least one pair of branches provided for each phase and connected in parallel with the DC voltage circuit, each pair of branches having power semiconductor switches. According to the invention, the fuse forms the connection between the first energy store and the second energy store. Advantageously, this makes it possible to achieve a DC voltage circuit, and thus a converter circuit with short-circuit current protection, with low inductance, since, in comparison with a converter circuit with short-circuit current protection according to the prior art, a fuse can be dispensed with, and thus the total parasitic inductance of the converter circuit can be reduced. Furthermore, the advantageously reduced total parasitic inductance results in any electrical oscillation between the total parasitic inductance and the energy stores of the DC voltage circuit, brought about by a power semiconductor switch of a pair of branches of the converter circuit being switched, in particular being switched off, and having an only very small amplitude, in particular current amplitude. The electrical and thermal load on the components of the converter circuit can thus advantageously be reduced.

Furthermore, the assembly and design of the converter circuit with short-circuit current protection according to the invention are, owing to the use of only one fuse for the DC voltage circuit subsystem, very simple and it requires few components, which means that considerable cost savings can be made. In addition, the converter circuit according to the invention only requires a minimum amount of space and can thus advantageously have a compact design. The converter circuit according to the invention is advantageously suitable for applications with a single-phase supply and for applications having a large energy storage capacity.

These and further objects, advantages and features of the present invention can be gathered from the detailed description of preferred embodiments of the invention below in conjunction with the drawing.

Figure 1:
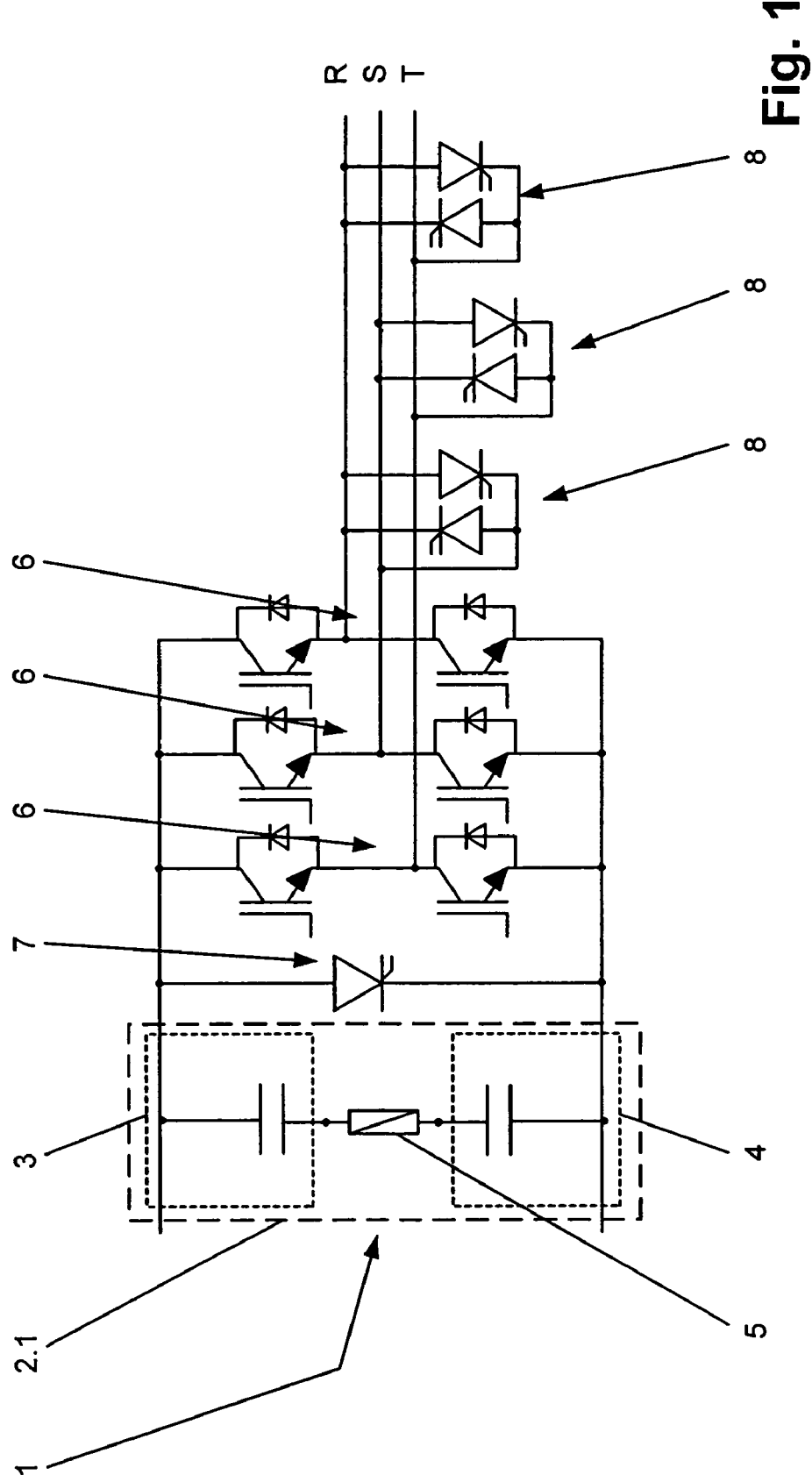
FIG. 1 shows a first embodiment of a converter circuit with short-circuit current protection according to the invention.

The reference numerals used in the drawing and their meanings are listed in summary in the list of reference numerals. In principle, identical parts in the figures are provided with identical reference numerals. The described embodiments represent by way of example the inventive subject matter and do not have a limiting effect.

Ways of Implementing the Invention

Figure 2:
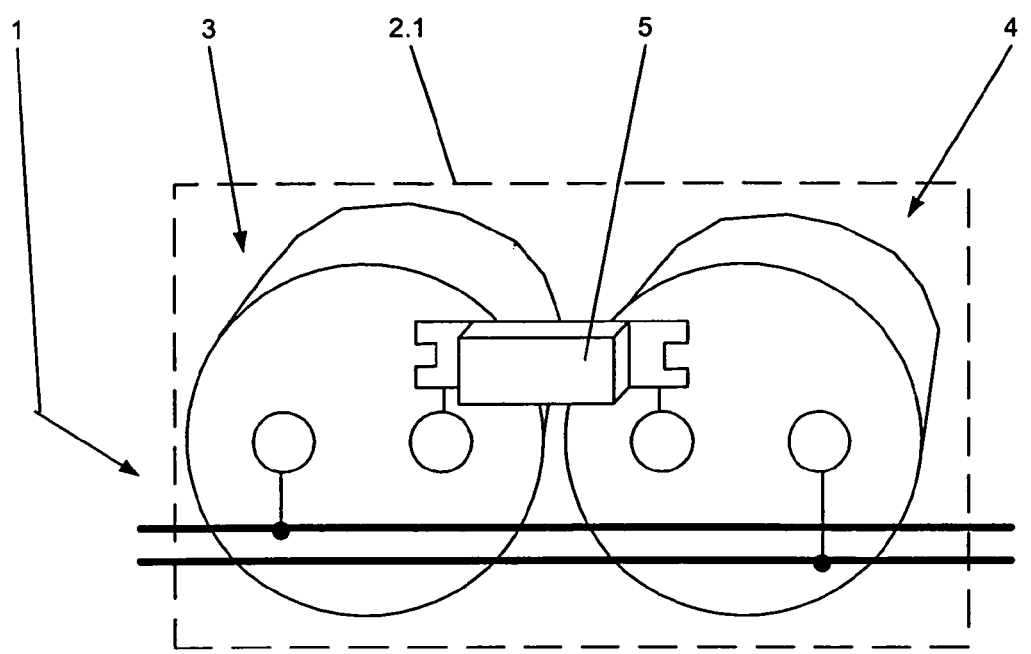
FIG. 2 shows a detail of the first embodiment of the converter circuit with short-circuit current protection according to the invention shown in FIG. 1.

FIG. 1 shows a first embodiment of a converter circuit with short-circuit current protection according to the invention. Furthermore, FIG. 2 shows a detail of the first embodiment of the converter circuit with short-circuit current protection according to the invention shown, in FIG. 1. According to FIG. 1, the converter circuit according to the invention has a DC voltage circuit 1 which is formed by a DC voltage circuit subsystem 2.1, the DC voltage circuit subsystem 2.1 having a first energy store 3 and a second energy store 4, which is connected in series with the first energy store 3, and a fuse 5. Furthermore, the converter circuit according to FIG. 1 has at least one pair of branches 6 provided for each phase R, S, T and connected in parallel with the DC voltage circuit 1, each pair of branches 6 having power semiconductor switches, i.e. generally each pair of branches 6 thus has any desired number of power semiconductor switches, so that embodiments are also conceivable which have only a single power semiconductor switch for each pair of branches 6. The connection between each pair of branches 6 and the DC voltage circuit 1 is made via a busbar system of the DC voltage circuit 1. Each power semiconductor switch is preferably in the form of a drivable bidirectional power semiconductor switch, in particular in the form of a bipolar transistor having insulated gate electrodes (IGBTs) having diodes which are also connected back-to-back in parallel. Of course, it is also conceivable that such an abovementioned drivable bidirectional power semiconductor may be in the form of, for example, a turn-off thyristor, such as a GTO or an IGCT with corresponding circuitry, or a power MOSFET with a diode connected back-to-back in parallel.

In the embodiments of the converter circuit according to the invention shown in FIG. 1 and in the embodiments described below according to FIG. 3 and FIG. 5, the converter circuit according to the invention is, for example, in each case of three-phase design. In general, the converter circuit according to the invention may, however, have any number of phases, in this case, as already mentioned, a pair of branches 6 with the corresponding power semiconductor switches being provided for each phase.

According to the invention, the fuse 5 forms the connection between the first energy store 3 and the second energy store 4. This advantageously gives a DC voltage circuit 1, and thus a converter circuit with short-circuit current protection, with low inductance, since, in comparison with known converter circuits with short-circuit current protection, a fuse 5 can be dispensed with, and thus the total parasitic inductance of the converter circuit can be reduced. In comparison with many arrangements of fuses 5 in converter circuits according to the prior art, in normal operation, owing to the arrangement of the fuse 5 in the converter circuit according to the invention, only a comparatively small current flows through the fuse 5 so that an inexpensive fuse 5 with a low rated current can be selected. In addition, the now reduced total parasitic inductance results in any electrical oscillation between the total parasitic inductance and the energy stores 3, 4 of the DC voltage circuit 1, brought about by a power semiconductor switch of a pair of branches 6 of the converter circuit being switched, in particular being switched off, and having only a very small amplitude, in particular current amplitude. The electrical and thermal load on further components of the converter circuit can thus advantageously be reduced.

In the event of a short-circuit current occurring in one or more of the drivable power semiconductor switches of a pair of branches 6, the two energy stores 3, 4 discharge very rapidly, the short-circuit current predominantly flowing through the short-circuited power semiconductor switch(es) of the corresponding pair of branches 6. The fuse 5 forming the connection between the two energy stores 3, 4 now has the purpose of interrupting this short-circuit current as rapidly as possible by isolating the DC voltage circuit subsystem 2.1 and thus of keeping the short-circuit current away from the predominantly affected pair of branches 6 and the other pairs of branches 6. The fuse 5 is preferably in the form of a fuse link since they are sufficiently rapid and also have a low inductance owing to their construction.

According to FIG. 1 and FIG. 2, the first energy store 3 of the DC voltage circuit subsystem 2.1 has one capacitor and the second energy store 4 of the DC voltage circuit subsystem 2.1 has one capacitor. In a second embodiment of a converter circuit with short-circuit current protection according to the invention as shown in FIG. 3 and in a detail as shown in FIG. 4 of the second embodiment of the converter circuit with short-circuit current protection according to the invention as shown in FIG. 3, the first energy store 3 of the DC voltage circuit subsystem 2.1 has two capacitors and the second energy store 4 of the DC voltage circuit subsystem 2.1 likewise has two capacitors. In general, it is thus conceivable for the first energy store 3 of the DC voltage circuit subsystem 2.1 to have at least one capacitor and the second energy store 4 of the DC voltage circuit subsystem 2.1 to likewise have at least one capacitor. According to FIG. 3 and FIG. 4, in the case of a first energy store 3 of the DC voltage circuit subsystem 2.1 having two or more capacitors, the capacitors are connected in parallel. Furthermore, according to FIG. 3 and FIG. 4, in the case of a second energy store 4 of the DC voltage circuit subsystem 2.1 having two or more capacitors, the capacitors are also connected in parallel. The abovementioned parallel circuit of the capacitors advantageously increases the capacitance of the DC voltage circuit subsystem 2.1 and thus of the DC voltage circuit 1 itself. Alternatively, it is also conceivable for, in the case of a first energy store 3 having two or more capacitors, the capacitors to be connected in series and, in the case of a second energy store 4 having two or more capacitors, the capacitors likewise to be connected in series.

The abovementioned series circuit of the capacitors can advantageously cause an increase in the voltage of the DC voltage circuit subsystem 2.1 and thus of the DC voltage circuit 1 itself, since the total voltage of the DC voltage circuit subsystem 2.1 is the sum of the individual voltages across each capacitor.

Figure 3:
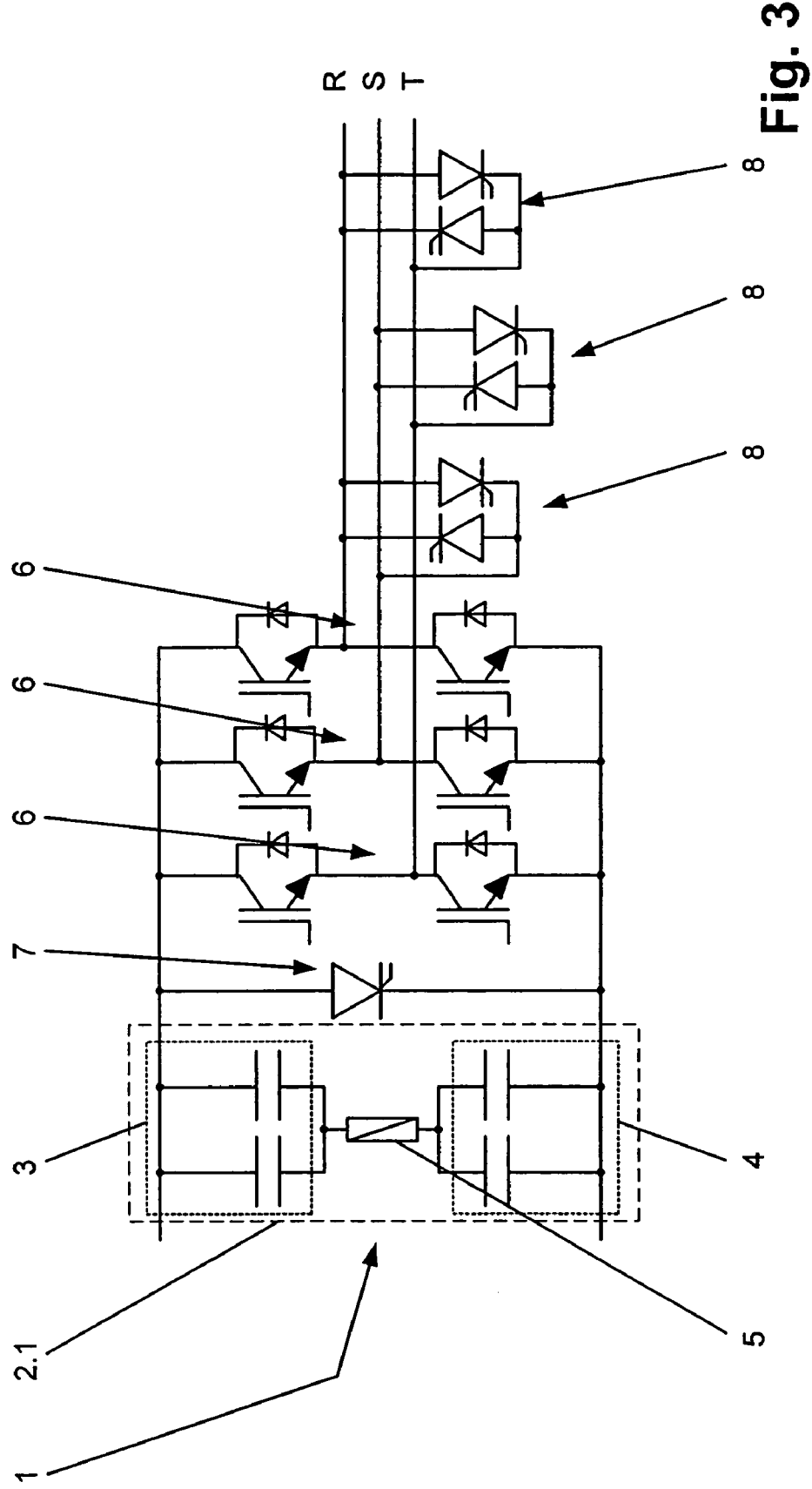
FIG. 3 shows a second embodiment of a converter circuit with short-circuit current protection according to the invention.
Figure 4:
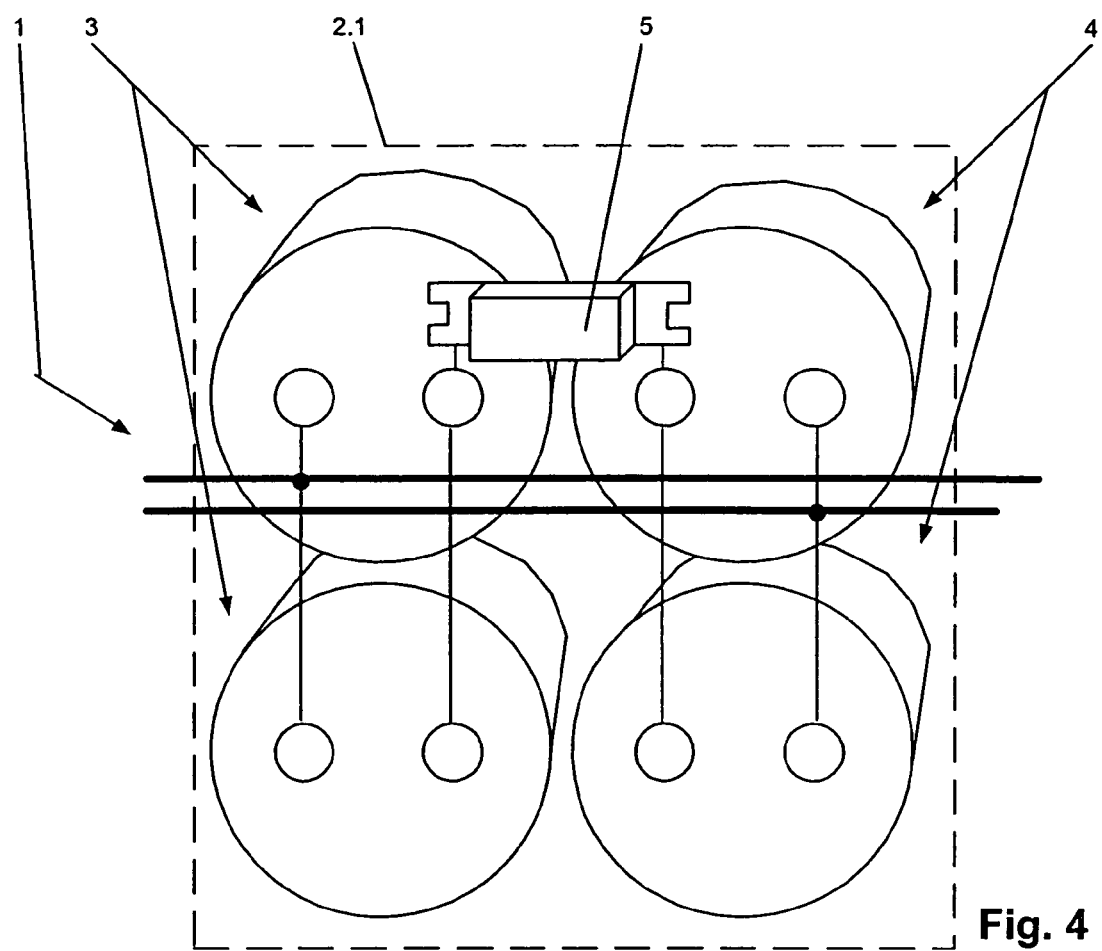
FIG. 4 shows a detail of the second embodiment of the converter circuit with short-circuit current protection according to the invention shown in FIG. 3.

According to FIG. 1 and FIG. 3, in each case two phases R, S, T are connected to one another via a first drivable short-circuit element 8. The connection between the respective phases R, S, T has, in this case, a low impedance value, i.e. has only a very low series impedance. This first drivable short-circuit element 6, in the event of a short on one or more phases R, S, T, prevents a short-circuit current, caused by the short circuit, from the phases R, S, T, i.e. for example from an electrical power supply system, from flowing through the power semiconductor switches of the corresponding pairs of branches 6, in particular in the case of correspondingly designed power semiconductor switches through the diodes connected back-to-back in parallel, or only allows it to flow with a low amplitude, so that the power semiconductor switches are not damaged or destroyed further or are not damaged or destroyed at all. The first short-circuit element 8 is driven when a short-circuit current is detected in or on a pair of branches 6 by means of a detection device, the first drivable short-circuit element 8 in this case short-circuiting the two phases R, S, T connected in each case to the first short-circuit element 8. For a three-phase converter circuit according to the invention, it is also conceivable to provide in each case one first short-circuit element 8 for only two phases R, S, T. Advantageously, such a first drivable short-circuit element 8 is formed from two drivable power semiconductors connected back-to-back in parallel and each having pressure contact, such as disk thyristors or GTOs. The first drivable short-circuit element 8 may also be in the form of a triac.

According to FIG. 1 and FIG. 3, the converter circuit according to the invention has at least one second drivable short-circuit element 7 which is connected in parallel with the DC voltage circuit subsystem 2.1. In the event of a short circuit in one or more of the drivable power semiconductor switches of a pair of branches 6, this second drivable short-circuit element 7 ensures that a short-circuit current, caused by the short circuit, from the energy stores 3, 4 or from the phases R, S, T, i.e. for example from an electrical power supply system, only flows very briefly through the short-circuited power semiconductor switch(es) of the corresponding pair of branches 6 and is then diverted through the second short-circuit element 7 in order that the short-circuited power semiconductor switches are not damaged or destroyed any further. The second short-circuit element 7 is driven when a short-circuit current is detected in or on a pair of branches 6 by means of the detection device, the second drivable short-circuit element 7 in this case being short-circuited by corresponding switching of the DC voltage circuit 1. When driving the second short-circuit element 7, the diodes connected back-to-back in parallel are, in the case of corresponding power semiconductor switches, subjected to the short-circuit current when, for example, a first short-circuit element 8 is not provided. Advantageously, such a second drivable short-circuit element 7 is in the form of a drivable power semiconductor having pressure contact, such as a disk thyristor or a GTO. This second drivable short-circuit element 7 having this construction is preferably arranged directly at the connection of a pair of branches 6 and the busbar system to the DC voltage circuit 1, as a result of which further space savings can be made and a low-inductance converter circuit according to the invention can be achieved. In order to increase the current-carrying capacity in the case of the short-circuiting, described in detail above, of the DC voltage circuit subsystem 2.1 and thus of the DC voltage circuit 1, two or more second drivable short-circuit elements 7 connected in parallel with the DC voltage circuit subsystem 2.1 may also be provided. A further advantage of the second short-circuit element 7 is that the two energy stores 3, 4 of the DC voltage circuit subsystem 2.1 are discharged at any early stage by the switching of the second short-circuit element 7 and thus the fuse 5 can respond more quickly. The early response of the fuse 5 can protect the pair of branches 6 which is predominantly affected by the short circuit and the other pairs of branches 6 more effectively against further damage or destruction.

Figure 5:
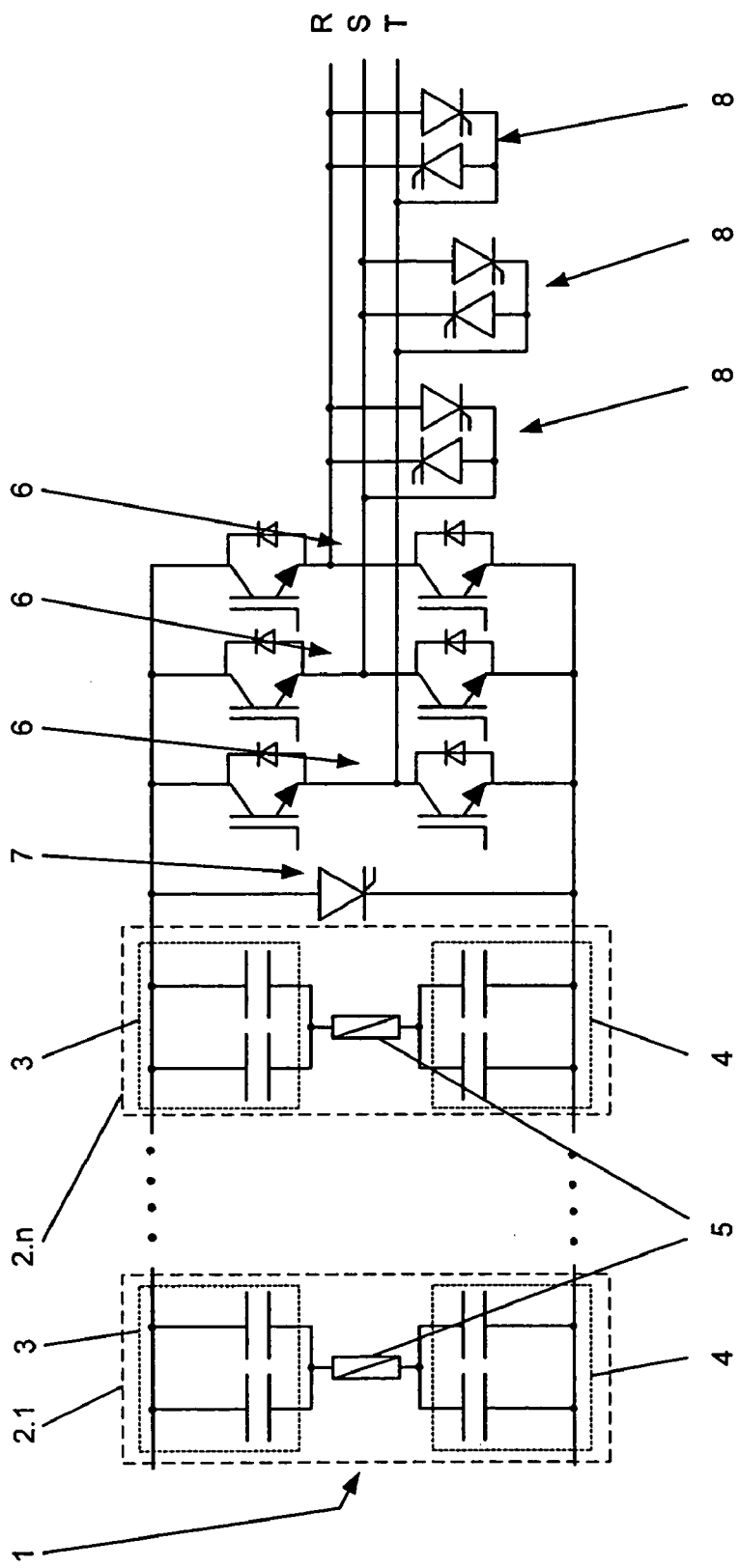
FIG. 5 shows a third embodiment of a converter circuit with short-circuit current protection according to the invention.

FIG. 5 shows a third embodiment of a converter circuit with short-circuit current protection according to the invention. The converter circuit according to FIG. 5 differs from the embodiments of the converter circuit illustrated in FIG. 1 and FIG. 3 and described in detail above in that the DC voltage circuit 1 has at least one further DC voltage circuit subsystem 2.2, . . . , 2.n of the previous DC voltage circuit subsystem 2.1, the DC voltage circuit subsystems 2.1, . . . , 2.n being connected in parallel with one another. As in FIG. 3, each DC voltage circuit subsystem 2.1, . . . , 2.n may have, according to FIG. 5, two or more capacitors for the associated first energy store 3 and two or more capacitors for the associated second energy store 4. As in FIG. 3, the capacitors of the first and second energy store 3, 4 of each DC voltage circuit subsystem 2.1, . . . , 2.n are, according to FIG. 5, in this case preferably each connected in parallel. As already mentioned in the description of the second embodiment of the converter circuit according to the invention as shown in FIG. 3, the parallel circuit of the capacitors advantageously increases the capacitance of the respective DC voltage circuit subsystem 2.1, . . ., 2.n and thus of the DC voltage circuit 1 itself. Alternatively, it is also conceivable, as has also already been mentioned in the description of the second embodiment of the converter circuit according to the invention as shown in FIG. 3, for the capacitors of the first and second energy store 3, 4 of each DC voltage circuit subsystem 2.1, . . . , 2.n each to be connected in series. This series circuit of the capacitors can advantageously cause the voltage of the respective DC voltage circuit subsystem 2.1, . . . , 2.n and thus of the DC voltage circuit 1 itself to be increased. Naturally, the first energy store 3 and the second energy store of each DC voltage circuit subsystem 2.1, . . . , 2.n may also have in each case only one capacitor. In the embodiment of the converter circuit according to FIG. 5, as in FIG. 1 and FIG. 3, a first drivable short-circuit element 7 and, for in each case two phases R, S, T, a second drivable short-circuit element 8 is provided, reference being made to the detailed description for FIG. 1 and FIG. 3 of the first and second drivable short-circuit element 7, 8 with the advantages noted there. Of course, in the embodiment of the converter circuit according to the invention as shown in FIG. 5, as in FIG. 1 to FIG. 4, a fuse 5 is provided for each DC voltage circuit subsystem 2.1, . . . , 2.n and forms the connection between the first energy store 3 of the associated DC voltage circuit subsystem 2.1, . . . , 2.n and the second energy store 4 of said DC voltage circuit subsystem 2.1, . . . , 2.n. The advantage of providing further parallel-connected DC voltage circuit subsystems 2.2, . . . , 2.n in addition to the previous DC voltage circuit subsystem 2.1 is that the total parasitic inductance can be reduced further by the parallel circuit of the DC voltage circuit subsystems 2.1, . . . , 2.n. This also advantageously ensures that the amplitude of the electrical oscillation mentioned initially between the total parasitic inductance and all of the first and second energy stores 3, 4 of the DC voltage circuit 1 can be reduced further. The electrical and thermal load on further components of the converter circuit can thus advantageously be reduced to a minimum.

A further advantage is the fact that, in the event of a short circuit within one of the DC voltage circuit subsystems 2.1, . . . , 2.n, only the DC voltage circuit subsystem 2.1, . . . , 2.n affected by the short circuit is isolated from the rest of the DC voltage circuit 1 by the associated fuse 5. These redundant DC voltage circuit subsystems 2.1, . . . , 2.n therefore advantageously make it possible to achieve a high degree of selectivity so that the converter circuit according to the invention can continue to be operated virtually without any restrictions using the remaining DC voltage circuit subsystems 2.1, . . . , 2.n which are not affected by the short circuit. When the converter circuit with short-circuit current protection according to the invention is used, for example, for traction applications in electric railroads, such continued operation of the converter circuit is particularly imperative.

The converter circuit with short-circuit current protection according to the invention is distinguished overall by an installation-friendly, simple and thus cost-effective construction, can operate with a minimum number of components and can furthermore be designed in a space-saving and thus compact manner.

LIST OF REFERENCE NUMERALS

1 DC voltage circuit
2.1, . . . , 2.n DC voltage circuit subsystem
3 First energy store
4 Second energy store
5 Fuse
6 Pair of branches
7 Second drivable short-circuit element
8 First drivable short-circuit element

The invention claimed is:

1. A converter circuit with short-circuit protection comprising:
   a DC voltage circuit, which DC voltage circuit is formed by a DC voltage circuit subsystem, the DC voltage subsystem having a first energy store and a second energy store, which is connected in series with the first energy store;
   a fuse; and
   at least one pair of branches provided for each phase and connected in parallel with the DC voltage circuit, each pair of branches having power semiconductor switches, wherein the fuse forms the connection between the first energy store and the second energy store; and
   a drivable short-circuit element, wherein the drivable short-circuit element is connected in parallel with the DC voltage circuit subsystem, whereby the drivable short-circuit element is driven when a short-circuit current is detected in or on a pair of branches by means of a detection device and the drivable short-circuit element short-circuits the DC voltage circuit by corresponding switching.

2. The converter circuit as claimed in claim 1, wherein the first energy store has at least one capacitor, and wherein the second energy store has at least one capacitor.

3. The converter circuit as claimed in claim 2, wherein, in the case of a first energy store having two or more capacitors, the capacitors are connected in parallel, and wherein, in the case of a second energy store having two or more capacitors, the capacitors are connected in parallel.

4. The converter circuit as claimed in claim 2, wherein, in the case of a first energy store having two or more capacitors, the capacitors are connected in series, and
wherein, in the case of a second energy store having two or more capacitors, the capacitors are connected in series.

5. The converter circuit as claimed in claim 1, wherein in each case two phases are connected to one another via another drivable short-circuit element.

6. The converter circuit as claimed in claim 5, wherein the another drivable short-circuit element is formed from two drivable power semiconductor switches connected back-to-back in parallel and each having pressure contact.

7. The converter circuit as claimed in claim 1, wherein the drivable short-circuit element is in the form of a drivable power semiconductor having pressure contact.

8. The converter circuit as claimed in claim 1, wherein the DC voltage circuit has at least one further DC voltage circuit subsystem of the DC voltage circuit subsystem the DC voltage circuit subsystems being connected in parallel with one another.

* * * * *